Aug. 19, 1969  P. SOLBERG  3,461,793
SCREW PRESSES
Filed June 26, 1967  2 Sheets-Sheet 1
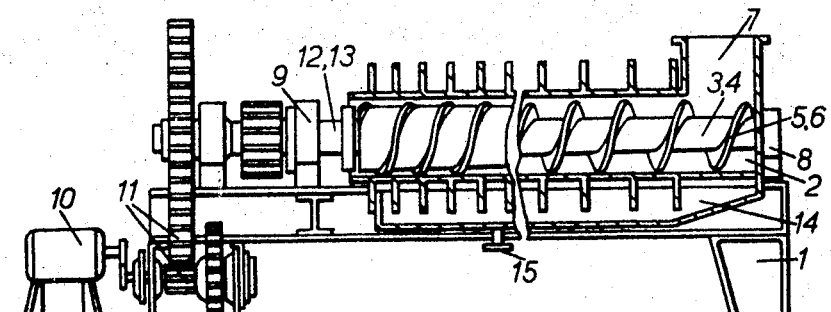
—FIG.1.—
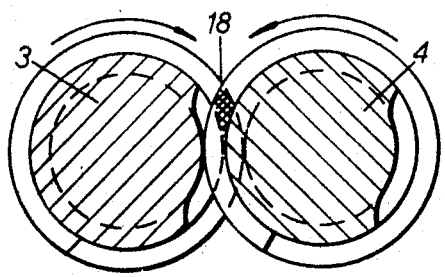
—FIG.4.—
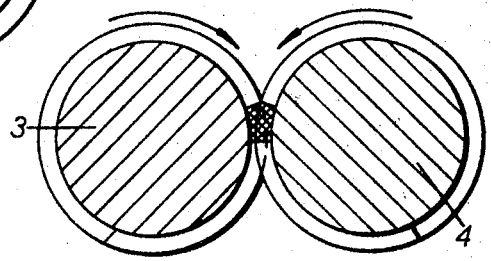
—FIG.3.—
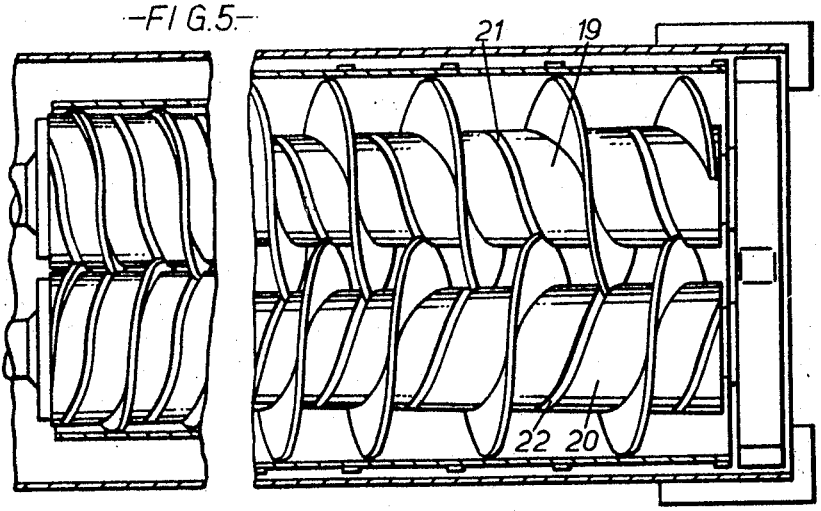
—FIG.5.—
INVENTOR:
PER F. SOLBERG
BY
Mallinckrodt and
Mallinckrodt
ATTORNEYS

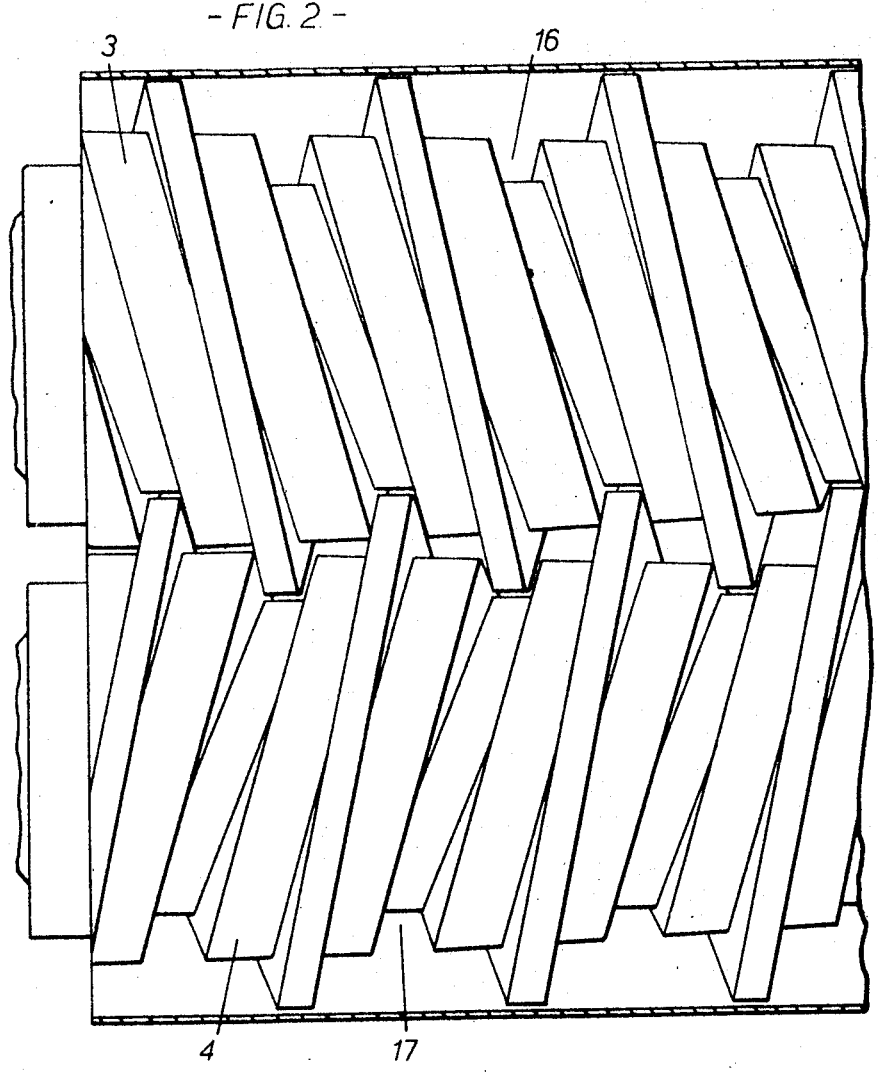

3,461,793
SCREW PRESSES
Per Solberg, Bergen, Norway, assignor to Stord Bartz
Industri A/S, Bergen, Norway
Filed June 26, 1967, Ser. No. 648,705
Int. Cl. B30b 9/12, 9/16, 9/18
U.S. Cl. 100—117                                10 Claims

ABSTRACT OF THE DISCLOSURE

A screw press having two helical screw elements accommodated side-by-side in a housing adapted for fluid drainage. The screw elements have threads with pitches which are substantially greater than their thickness in axial direction preferably at least three times greater than their thickness in axial direction and are arranged so that the threads of each element engage a helical groove formed in the spindle of the other adjacent element between the threads thereof.

---

This invention relates to screw presses.

In continuously working screw presses having screw elements which rotate in a surrounding housing, there is always a tendency for the material to rotate together with the screws of the press. As a result the advance of the material and with this also the pressing-out will cease—something which is referred to in the art as "slip"—instead of the material having the best possible straight line axial movement while the screws rotate according to the principle upon which the press is constructed. This tendency is a natural consequence of the material having in the passage of the press a larger contact surface with the screw than with the stationary housing, and of the passage becoming steadily narrower.

In two-screw presses, the screws are, therefore, arranged side-by-side, preferably parallel to each other, and arranged so tightly that the distance between their centre lines is less than the sum of their outer radii, that is to say, such that the threads on the one screw engine in the spaces between the threads on the other. With such an arrangement, the material is prevented from being rotated since at the position where the screws engage with each other, the cross-section of the passage is so narrow that the material here, by a possible tangential movement, will be backed up and will not pass around further.

However, it appears that by pressing various types of material which are difficult to work with, there still occurs to a certain degree a tangential sliding around the screws—thus also past the narrow position where they are in engagement with each other—and this in spite of the fact that the screws are arranged so close to each other that, at certain positions, the top of the thread of the one screw only scarcely clears the spindle or stem on the adjacent screw. It is apparent that this acts disadvantageously on the effect of the press, because the material is not pressed as hard as it should be and the capacity is reduced correspondingly, while the time for the material to pass through the press is correspondingly extended.

It is an object of the invention to endeavour to eliminate the afore-mentioned disadvantages in conventional two-screw presses.

It is another object of the invention to increase the amount of fluid extracted from a given material.

It is still another object of the invention to make the capacity of the press as large as possible thereby reducing the consumption of energy relative to the amount of material treated and thus making it possible to employ smaller and hence cheaper presses and associated motors for a definite required capacity.

According to the present invention a screw press comprises two helical screw elements accommodated side-by-side within a housing adapted for fluid drainage so that the threads of each element engage a helical groove formed in the spindle of the adjacent element between the threads thereof, the pitches of the threads being substantially greater than the thickness thereof in axial direction preferably at least three times greater than the thickness thereof in axial direction.

With such a construction, the screw elements can be disposed closer to each other and the distance between the two screw spindles or stems can be reduced to a certain desired minimum at the outlet end of the press which, for example, may be only a few millimetres and the raw material is thus completely prevented from moving tangentially past this blocking position. Conveniently, the distance between the spindles at the outlet end of the press is less than half the thread height at that position. The result is that the disadvantageous "slip" in the press is avoided and the material is pressed forward in the manner which is expected. Another advantage in having such a blocking position at the outlet end is that soft material and, therefore, material which is difficult to press, which with a conventional screw construction is not precluded from being able to escape through the press without losing water, is effectively held back and, as a result, there is always obtained a controllable outward feeding of material dependent upon the speed of revolution of the press. It is preferred that the screw pitches of the two screw elements extend in mutually opposite directions. The helical groove must be formed so that in the axial direction of the screw element it has exactly the same pitch as the thread of the adjacent screw. The groove ought to be relatively narrow so that at those positions where it lies open and is filled by material, only a relatively small amount of material is received.

In two-screw presses having a constant outer thread diameter and screw spindles of varying diameter, such a helical groove in the spindle need only be formed at that position of the element where it is needed most. In presses which have enlarged and constant outer diameters at the inlet end as compared with the outlet end of the housing, the intermediate space between the screws can also be narrowed here in a similar manner as described above, but to a lesser degree though. By arranging the two screw elements so that their axes form a tapering angle with each other, the space between those elements having threads of constant outer diameter can also be narrowed over the whole or a portion of the length by cutting a groove in the spindle as mentioned above. In this case also, however, the distance at the narrowed section will be least where the screw spindle has the largest diameter.

When the cake-like product leaves the press, it has the form of a hollow cylinder in accordance with the shape of the passage of the press at the outlet end. When screw elements are being made, the aim is to have a definite, desired thickness for the cake-like product while the screw threads are given a proportionate height. When there is required as complete a mutual engagement between the threads on the two screw elements as possible, one is strongly bound when employing conventional two-screw presses to use screws which give a definite thickness of product when the screws have a fixed diameter and axial distance, it being impossible to reduce the thickness of the product. It is possible to increase it but this is disadvantageous because the "slip" can increase because of the large opening in the backing-up zone. Therefore, with a preconstructed press, the original predetermined thickness of the cake-like product can only be changed to a negligible extent. In constructing the screw elements in accordance with the invention, one is more free with respect to such changes and a factory can equip its presses with several different elements which give different product thickness all according to the different types of material which one wishes to press. This can often be of interest when the extraction of fluid from a material as known is affected by the thickness of the product and likewise this is of significance in the ability of the press to pass through the often unavoidable foreign bodies without causing damage.

In order that the invention can be more clearly understood, convenient embodiments thereof will now be described, by way of example, with reference to the accompanying drawings in which:

FIGURE 1 is a vertical section through a conventional two-screw press.

FIGURE 2 is a section of two cooperating screw elements in a two-screw press constructed in accordance with the invention.

FIGURE 3 is a cross-section through the screw elements in a press of conventional construction, taken just at the outlet for the material from the press.

FIGURE 4 is a cross-section through the screw elements according to FIGURE 2 taken, as in FIGURE 3, at the said outlet for the material, and FIGURE 5 is a scrap section of a modified press construction according to the invention in which a portion of the screw elements at the inlet end has a larger diameter than the remaining portion of the elements and in which the tops of the threads engage helical grooves in the spindles both at the inlet end and the outlet end of the housing.

In FIGURE 1 there is illustrated a press of the kind with which the invention is concerned, the screw elements thereof being threadedly engaged in the manner which has hitherto been conventional. On a stand 1, there is arranged a reinforced drainage means, the so-called press basket 2, in which two screw elements 3, 4 having threads 5, 6 thereon rotate. The wet mass of raw material which is to be pressed is introduced through a feed hopper 7 at the inlet end of the press. The screw elements are mounted in bearings 8 and 9. A motor 10 drives the screw shafts 12 and 13 via a gear means 11. In addition, there is present below the whole press basket, a gathering tray 14 having an outlet union 15 for the fluid which is extracted or pressed out of the raw material. The finally pressed material, namely the cake-like product, issues out of the press at the outlet end of the basket through an outlet hopper (not shown).

The construction described in the last-preceding paragraph is well known for two-screw presses. In such a press, however, the distance between the screw spindles of the press at the narrowest section in the backing-up zone cannot be less than the height of the threads.

In FIGURE 2, it is shown, however, how, by cutting suitable grooves 16 and 17 in the screw spindles, the tops of the threads can be made to enter into them, whereby the distance between the screw spindles can be made very small so that the through-passage of material in a tangential direction can be effectively prevented at this position.

From FIGURE 4, it is seen that at the hatched position 18 there is formed a backing-up zone where complete stoppage against tangential movement of the raw material is attained.

From FIGURE 5, it is seen that a portion 19, 20 on the screw elements at the inlet end has a larger thread diameter than the remaining portion of the elements. As a result there is obtained an improved outward pressing motion of the raw material. Here also there are grooves 21, 22 into which the tops of the threads extend so that the effect according to the invention is also achieved at this position.

By tests carried out in connection with the present invention, a two-screw industrial press was equipped with screw elements of conventional construction and, in addition, with elements which had a thicker spindle in the outlet section (and with less thickness in the cake-like product) and, at the same time, with grooves cut into the spindle in accordance with the invention. It has been found that with the last-mentioned screw elements a significant increase in the quantum capacity is achieved and also a drier cake-like product is obtained, especially at higher rates of revolution.

What I claim is:

1. In a screw press including a housing with inlet and outlet ends and adapted for fluid drainage, two helical screw elements each comprising a spindle formed with integral threads and accommodated side-by-side within said housing, said elements being arranged so that the threads of one element engage the spindle of the other adjacent element in the spaces between the threads thereof with the pitches of said threads being substantially greater than the thickness thereof in axial direction preferably at least three times greater than the thickness thereof in axial direction, the improvement consisting in each of the spindles of said elements being formed with a helical groove for the reception of the threads of the adjacent element.

2. A press according to claim 1, wherein the helical grooves are only formed in portions of the spindles at the outlet end of the housing.

3. A press according to claim 2, wherein the screw threads at the inlet end of the housing are of enlarged diameter as compared with the threads at the outlet end.

4. A press according to claim 1, wherein the screw threads at the inlet end of the housing are of enlarged diameter as compared with the threads at the outlet end.

5. A press according to claim 1, wherein the distance between the spindles at the outlet end of the housing is less than half the thread height at that position.

6. A press according to claim 1, wherein the screw pitches of said two screw elements extend in mutually opposite directions.

7. A screw press which includes, in combination, a housing with inlet and outlet ends and openings for fluid drainage, two helical screw elements each comprising a spindle formed with integral threads and accommodated side-by-side within said housing and in parallel relation, said elements being arranged so that the threads of each element engage a helical groove formed in the spindle of the adjacent element between the threads thereof, the threads at the inlet end of the housing being of enlarged diameter as compared with the threads at the outlet end and the pitches of the threads being substantially greater than the thickness thereof in axial direction, preferably at least three times greater than the thickness thereof in axial direction.

8. A press according to claim 7, wherein the helical grooves are only formed in portions of the spindles at the outlet end of the housing.

9. A press according to claim 7, wherein the distance between the spindles at the outlet end of the housing is less than half the thread height at htat position.

10. A press according to claim 7, wherein the screw pitches of said two screw elements extend in mutually opposite directions.

References Cited

UNITED STATES PATENTS 2,567,219   9/1951   Lesniak _____ 100—146 XR
3,070,005   12/1962  Kemp et al. _____ 100—146

FOREIGN PATENTS 647,724   11/1928   France.

ROBERT L. BLEUTGE, Primary Examiner

U.S. Cl. X.R.

100—146